United States Patent
Chen

(10) Patent No.: US 6,334,360 B1
(45) Date of Patent: Jan. 1, 2002

(54) WATER LEVEL CONTROLLER WITH CONDUCTANCE TERMINALS

(75) Inventor: Po-Huei Chen, No. 186, Bi-Hsin Rd., Fen-Yuan Hsiang, Changhwa Hsien (TW)

(73) Assignees: Po-Huei Chen; Jung-Wei Chang, both of (TW)

( * ) Notice: Subject to any disclaimer, the term of this patent is extended or adjusted under 35 U.S.C. 154(b) by 0 days.

(21) Appl. No.: 09/566,991

(22) Filed: May 9, 2000

(51) Int. Cl.[7] .......................... G01F 23/00; G08B 21/00
(52) U.S. Cl. ..................... 73/304 R; 340/620
(58) Field of Search .................. 73/304 R; 340/620

(56) References Cited

U.S. PATENT DOCUMENTS

| | | | |
|---|---|---|---|
| 4,244,385 A | * 1/1981 | Hotine | 137/1 |
| 4,265,262 A | * 5/1981 | Hotine | 137/2 |
| 4,287,756 A | * 9/1981 | Gallagher | 73/61.1 R |
| 4,541,446 A | * 9/1985 | Hogan | 137/2 |
| 4,593,275 A | * 6/1986 | Kazandjoglou | 340/604 |
| 4,780,663 A | * 10/1988 | Mulder | 324/65 P |
| 5,489,371 A | * 2/1996 | Joseph et al. | 204/415 |

* cited by examiner

Primary Examiner—Hezron Williams
Assistant Examiner—Katina Wilson
(74) Attorney, Agent, or Firm—Bacon & Thomas, PLLC

(57) ABSTRACT

A water level controller for a tank has control circuitry and multiple conductance terminals connected to the control circuitry and located at different heights from the other. By such an arrangement, the water level can be determined when the conductance of the water measured by corresponding conductance terminals becomes zero. The water inlet can be controlled to add to the tank by the control circuitry as the conductance measured by two of the corresponding terminals becomes practically negligible. Consequently, the water level in the tank can be accurately controlled, and the controller can be used with pure water so as to enlarge the useful scope of the controller.

2 Claims, 4 Drawing Sheets

WATER LEVEL CONTROLLER WITH CONDUCTANCE TERMINALS

BACKGROUND OF THE INVENTION

1. Field of the Invention

The present invention relates to a water level controller, and more particularly to a water level controller with conductance terminals to control the water level in a tank.

2. Description of Related Art

Large amounts of water are used in many industrial processes. To accommodate the large quantities of water that are periodically required, tanks are used to store the reserve water. To keep the tank from running dry, a water level controller is mounted in the tank to control the water level in the tank. A conventional water level controller is a buoyant, hollow ball attached to one end a lever. The other end of the lever is pivotally connected to an inlet valve in the tank, such that the ball will move up or down according to the height of the water level as the ball floats on the surface of the water. When the water level goes down, the controller will open the inlet valve and allow water to flow into the tank to raise the water level in the tank. When the water level reaches some predetermined upper level, the controller will close the inlet valve and stop the water flowing into the tank. Thus, a water level controller is achieved.

However, because the tank for an industrial process is very huge, and the travel of the lever device is limited, the conventional ball controller with a lever device does not fit with a huge tank. Therefore, an another ball controller with a wire connected to the ball provided is used, such that the water level can be controlled based on the length of the wire. However, because the wire is flexible, the length of the wire may not be correct due to bends in the wire or the lateral movement of the ball relative to the water level.

In addition, a controller with a magnetic switch mounted on the ball is provided. Several magnetic sensors are mounted on the inner surface of the tank at different heights. When the ball falls with the water level and the magnetic switch faces the lowest magnetic sensor, the inlet valve will be opened to allow water to flow into the tank. When the magnetic switch is adjacent to the uppermost magnetic sensor, the controller will close the inlet valve and stop the water from flowing into the tank. Although the water level can be accurately controlled by the controller with a magnetic device, the controller does not operate properly when the ball moves laterally relative to the water level and the magnetic switch does not face the magnetic sensors. Therefore, the water level control by the ball controller is not accurate.

Another conventional controller comprises a light mounted on the top of the tank and a light meter mounted on the bottom of the tank to measure the intensity of the light through the water. The water level can be determined by the change in the intensity of the light measured by the light meter. The controller with the light meter can accurately control the water level. However, the light meter is not only very expensive, but is also able to receive light from any source. The light meter is easily influenced by other lights.

Another conventional controller with electrical terminals can detect the water level by sensing whether a desired electrical terminal is electrically connected with the other desired one through the ions in water or not. However, because pure, untreated water is often used in industrial processes, the water is so pure that it will not conduct electricity. Therefore, the conventional controller with electric terminals cannot used with pure water. The scope of using this conventional controller is limited.

To overcome the shortcomings, the present invention tends to provide an improved water level controller with conductance terminals to mitigate or obviate the aforementioned problems.

SUMMARY OF THE INVENTION

The main objective of the invention is to provide an improved a water level controller with control circuitry and multiple conductance terminals connected to the control circuitry and located at different heights such that the water level can be determined through the conductance of the water measured by the corresponding conductance terminals. Consequently, the water level in the tank can be accurately controlled, and the controller can be used with pure water.

Other objects, advantages and novel features of the invention will become more apparent from the following detailed description when taken in conjunction with the accompanying drawings.

DETAILED DESCRIPTION OF PREFERRED EMBODIMENT

Figure 1:
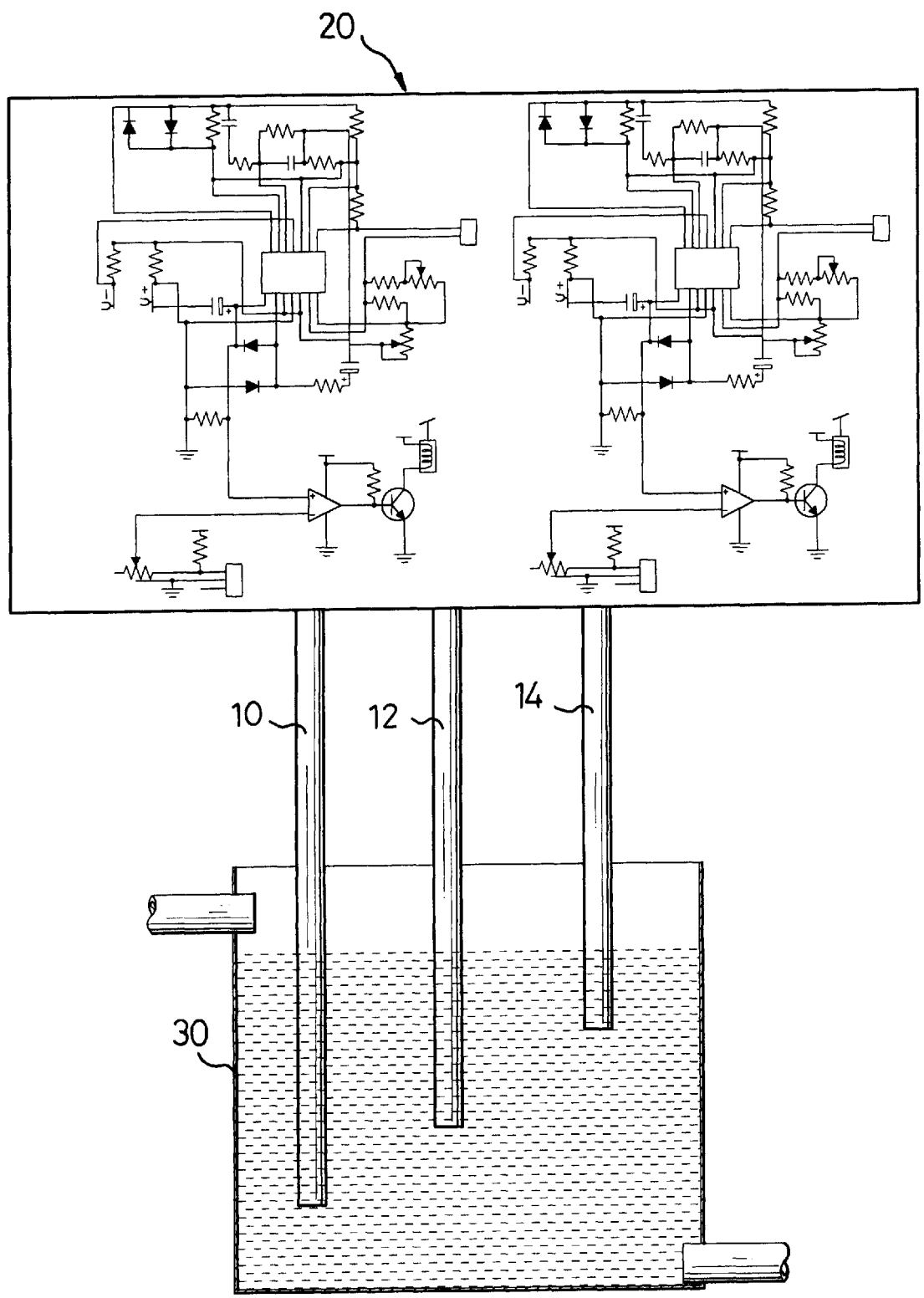
FIG. 1 is a front plan view and schematic diagram of a water level controller with conductance terminals in accordance with the present invention.
Figure 4:
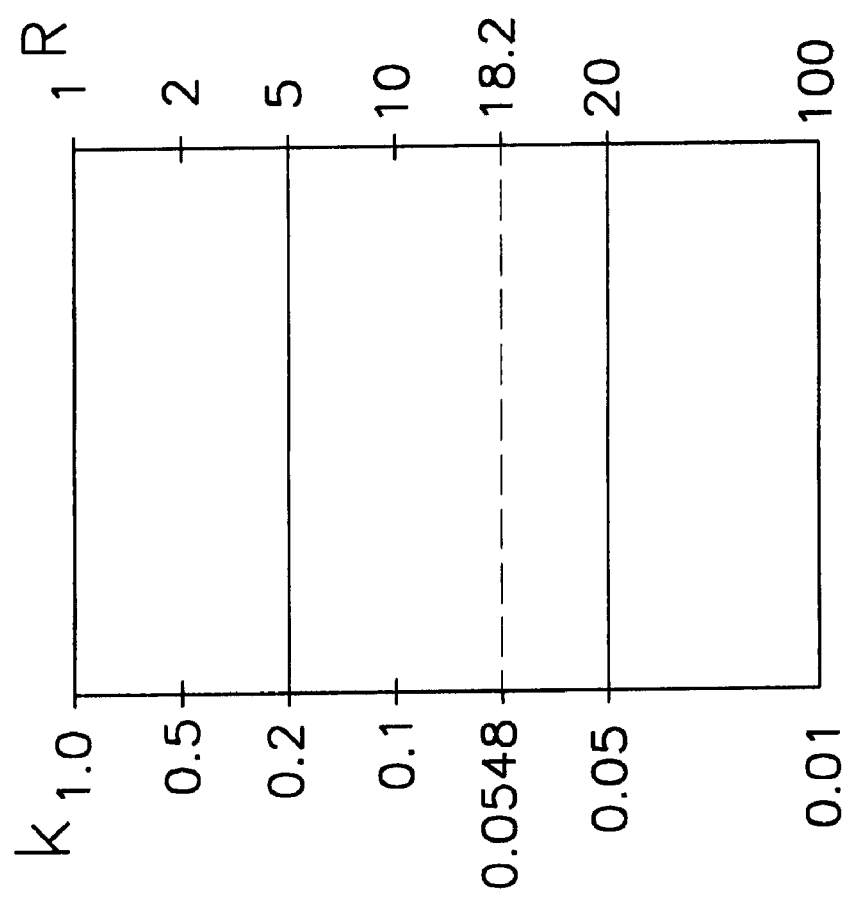
FIG. 4 is a chart comparing the conductance and the resistance.

Referring to FIG. 1, a water level controller in accordance with the present invention comprises control circuitry (20) and multiple conductance terminals (10, 12, 14) each connected to the control circuitry (20), where conductance is the inverse of the resistance, as shown in FIG. 4. Each conductance terminal (10, 12, 14) is located at a different height from the others. Preferably, there are three conductance terminals (10, 12, 14) in the controller. A first and second terminal (10, 12) are located near the bottom of the tank (30) with the second terminal (12) not lower than the first terminal (10). A third terminal (14) is located near the top of the tank (30), and higher than the first and the second terminals (10, 12).

Figure 2:
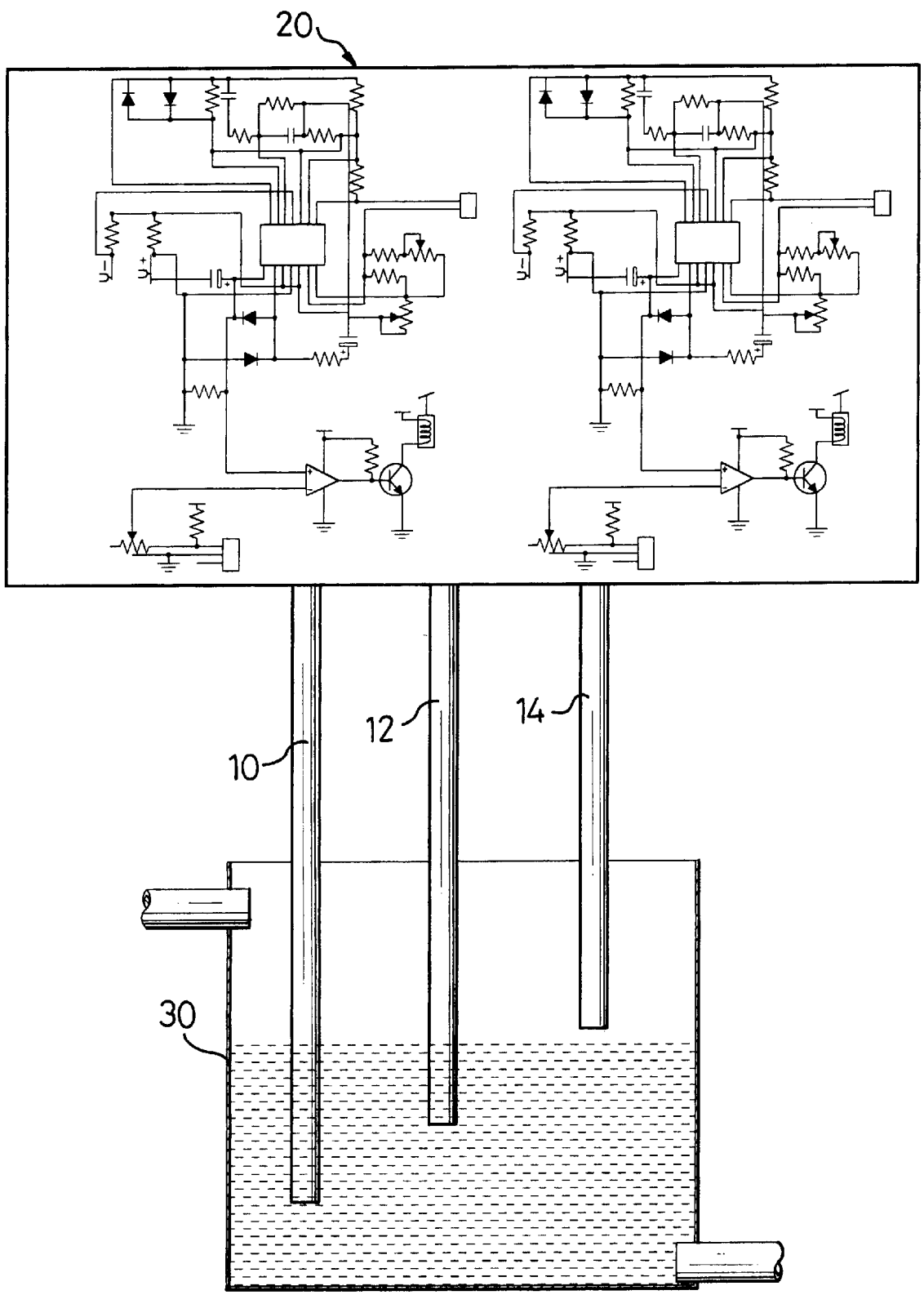
FIG. 2 is an operational front plan view and schematic diagram of the controller in FIG. 1 with the water level below the third terminal.
Figure 3:
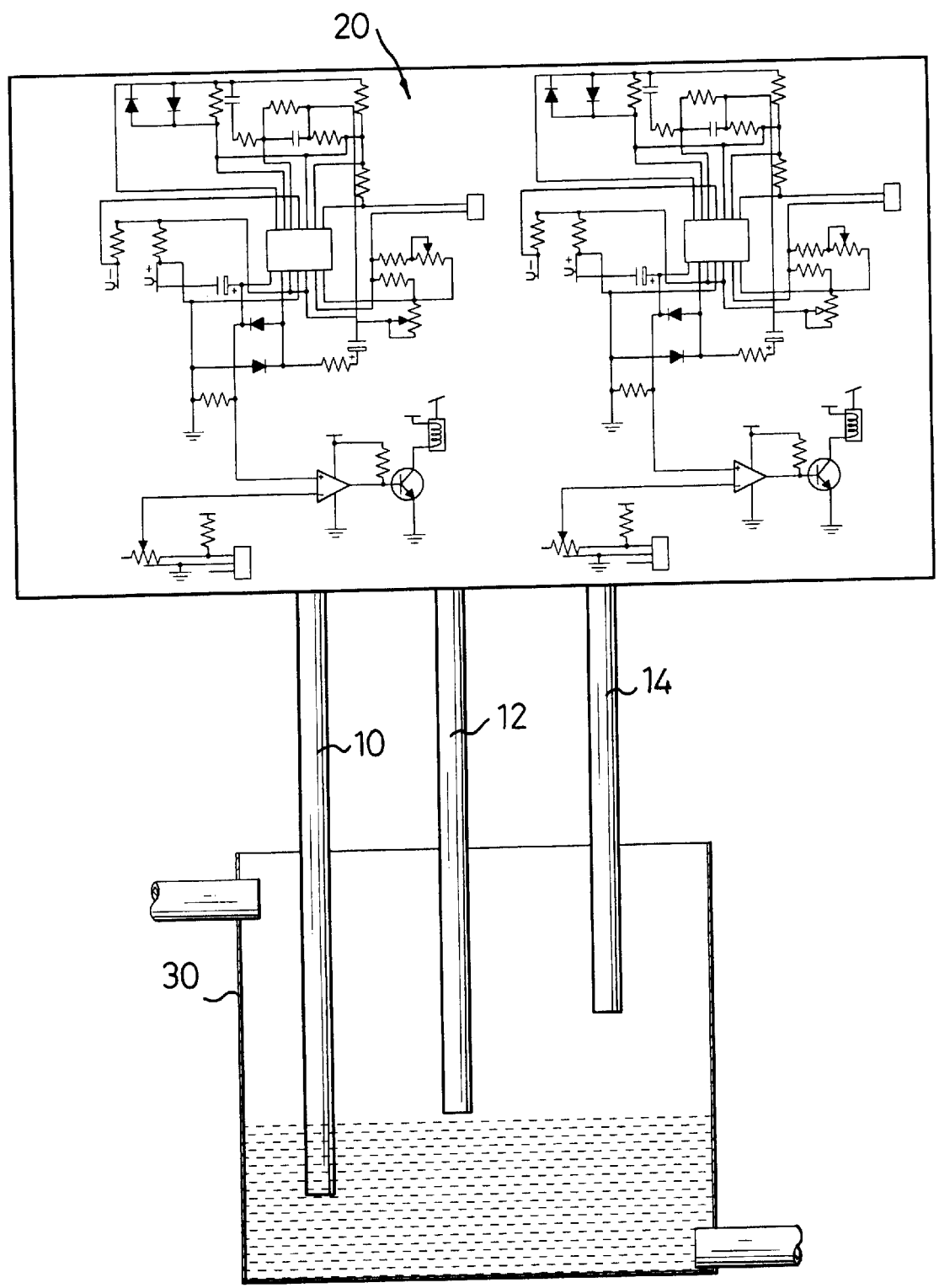
FIG. 3 is an another operational front plan view and schematic diagram of the controller in FIG. 1 with the water level below the second terminal.

With reference to FIGS. 1 and 2, all of the conductance terminals (10, 12, 14) are initially inserted into the water contained in the tank (30). Thus, each terminal (10, 12, 14) can cooperate with the other one to measure the conductance of the water, even pure water. When the water in the tank (30) is used in an industrial process, and the water level descends below the third terminal (14). The conductance between the third terminal (14) and the other terminals (10, 12) becomes practically negligible due to the air gap. When the water level descends below the second terminal (12), the conductance between the first and second terminals (10, 12) also becomes practically negligible. At this time, the control circuitry (20) will open the inlet valve to allow water to flow into the tank (30). When the third terminal (14) contacts the water, the conductance between the third terminal (14) and the others will be the same as the previous numerical value. The control circuitry (20) will then turn off the inlet valve and stop the water from flowing into the tank (30). This can accurately control the water level in the tank (30) to keep the water from running dry. In addition, because the pure water still has a resistance, the conductance of the pure water actually exists and can be measured by the conductance terminals (10, 12, 14). Consequently, the controller with the conductance terminals (10, 12, 14) can be used with pure water, and the scope of use of the controller can be enlarged.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A water level controller for a tank, the water level controller comprising:

control circuitry; and multiple conductance terminals connected to the control circuitry and located at different heights from each other, a pair of the multiple conductance terminals detect conductance of pure water in the tank so that the water level is determined when the conductance of pure water measured between the pair of the multiple conductance terminals becomes practically negligible.

2. The water level as claimed in claim 1, wherein the multiple conductance terminals are three in number.

* * * * *